United States Patent Office 3,087,151
Patented Apr. 23, 1963

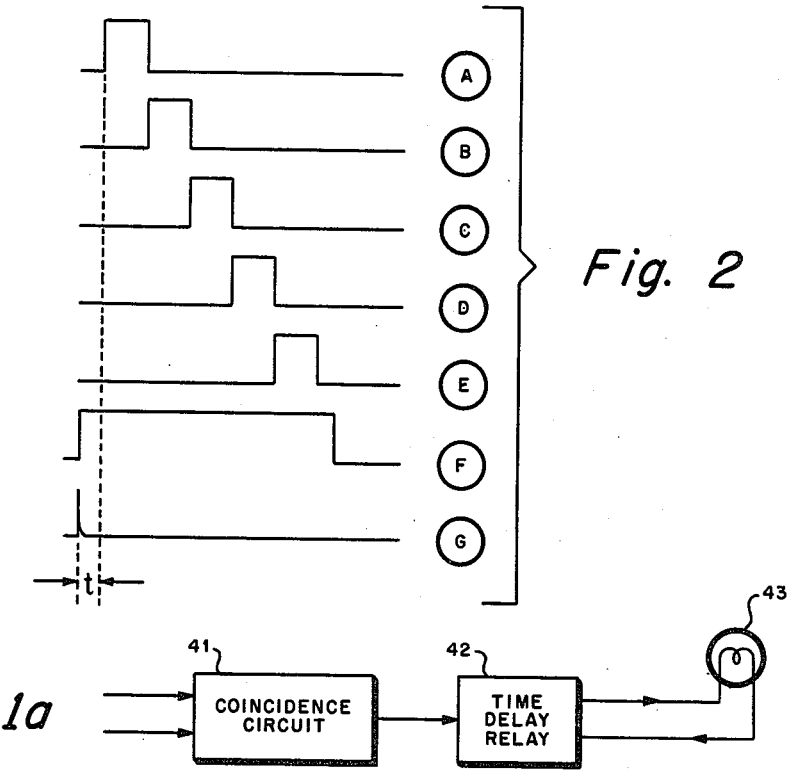
Fig. 2
Fig. 1a
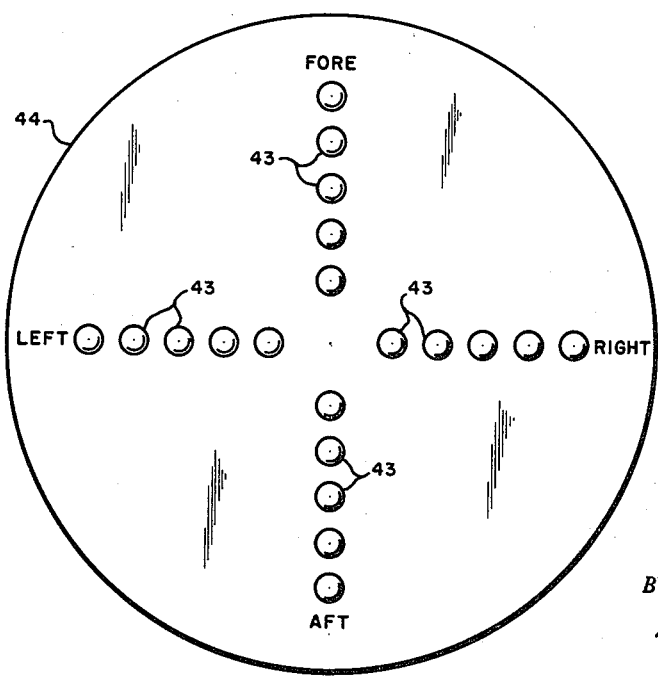
Fig. 3

3,087,151
PROXIMITY WARNING OR POSITION
SEPARATION DEVICE
Harry Vantine, Jr., 1545 Marian Road, Abington, Pa.
Filed Oct. 31, 1960, Ser. No. 66,365
12 Claims. (Cl. 343—6.5)
(Granted under Title 35, U.S. Code (1952), sec. 266)

The invention described herein may be manufactured and used by or for the Government of the United States of America for governmental purposes without the payment of any royalties thereon or therefor.

The present invention relates to a proximity warning or position separation device, and more particularly to an interrogator-transponder system for indicating bearing and distance between similarly equipped aircraft or vehicles.

In comparison with known prior art devices, the present invention is characterized by unusual simplicity and reliability while at the same time providing for acceptable accuracy.

It is therefore an object of the present invention to provide a proximity warning or position separation device characterized by unusual simplicity and reliability.

It is another object of the present invention to provide a system of the character set forth in the next preceding object comprising an interrogator-transponder system.

Other objects and many of the attendant advantages of the present invention will become apparent upon consideration of the following detailed description of an embodiment thereof when read in conjunction with the accompanying drawings wherein:

FIG. 1 illustrates in block diagram form an embodiment of the invention;

FIG. 1a in block diagram form illustrates a display circuit utilized in the embodiment of FIG. 1;

FIG. 2 shows various waveforms appearing in the embodiment of FIG. 1; and

FIG. 3 illustrates an indicator structure which may be employed in practicing the present invention.

Figure 1:
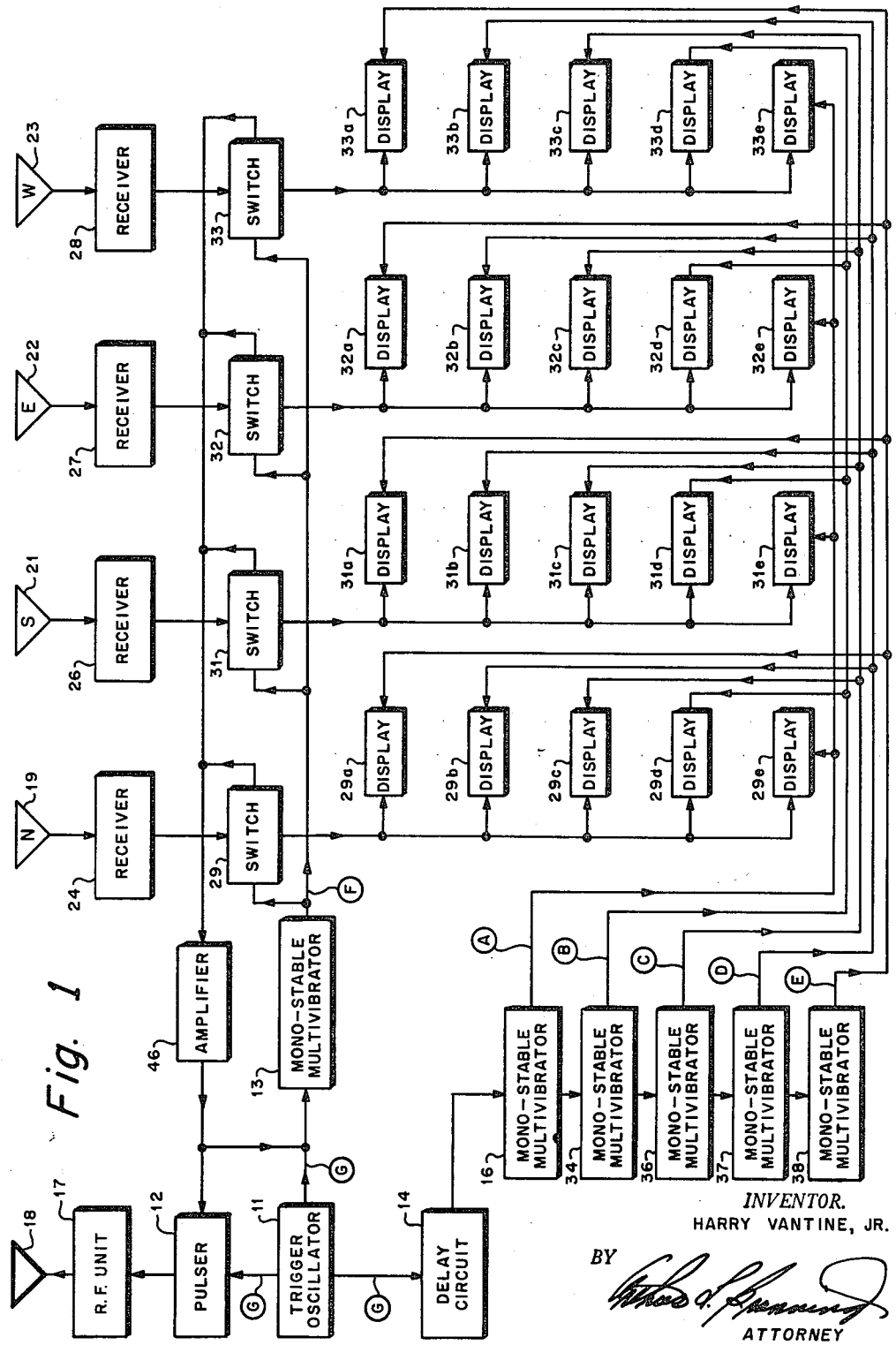

Referring now to FIG. 1, there is shown a trigger oscillator 11 of the free-running type. The output signal from trigger oscillator 11 is applied to a pulser 12, a monostable multivibrator 13, and through a delay circuit 14 to another monostable multivibrator 16.

Pulser 12, upon receipt of a trigger pulse from trigger oscillator 11, keys a radio frequency unit 17 whereupon a radio frequency pulse is emitted from an omnidirectional antenna 18.

Equipment, similar to that shown in FIG. 1, located within any aircraft within a selected range, upon receipt of the interrogating pulse from antenna 18 will function to transpond (transmit a reply pulse). The reply pulse is received upon one or more of directive antennas 19, 21, 22, or 23 and is coupled therefrom, respectively, to receivers 24, 26, 27, or 28. The output signals from the receivers are in turn respectively coupled through switch means 29, 31, 32, and 33, respectively, and applied as an input signal to display circuits 29a through 29e, 31a through 31e, 32a through 32e, and 33a through 33e, respectively.

The output signal from multivibrator 13, shown by waveform F in FIG. 2, which begins upon the occurrence of a pulse from trigger oscillator 11, waveform G, is applied to switching circuits 29, 31, 32, and 33 to couple the display circuits enumerated above to receivers 24, 26, 27, and 28 for an interval selected to accord with the desired range of the equipment. Switching circuits 29, 31, 32, and 33 may comprise electronic switches if desired.

By reference to FIG. 1 and to the waveforms of FIG. 2, it may be seen that multivibrators 16, 34, 36, 37, and 38 are coupled in cascade through delay circuit 14 to trigger oscillator 11 to sequentially generate a series of gates, waveforms A through E in FIG. 2, beginning after the occurrence of a trigger pulse from trigger oscillator 11 and each having a duration depending upon selected range segments. The gating pulses from multivibrators 16, 34, 36, 37, and 38 are respectively coupled to corresponding levels of display circuits 29a through 29e, 31a through 31e, 32a through 32e, and 33a through 33e.

By reference to FIG. 1a it will be seen that each of the display circuits may comprise a coincidence circuit 41 having one input thereto coupled to one of electronic switches 29, 31, 32, or 33 and another input thereto coupled to multivibrators 16, 34, 36, 37, or 38. The output signal from coincidence circuit 41 may be applied to the operating winding of a time delay relay 42 of the type which closes instantaneously and releases after a time delay. In the closed contact position, time delay relay 42 functions to connect a lamp 43 to a source of operating potential (not shown).

As may be seen by reference to FIG. 3, indicator lamps 43 of the display circuits may be arranged in any convenient descriptive pattern on a mounting panel 44.

In the operation of the illustrated embodiment of the invention, depending upon the range and azimuth between the interrogating and the transponding aircraft, one or more of display circuits 29a through 29e, 31a through 31e, 32a through 32e, and 33a through 33e will have applied thereto at the same time an enabling gate from one of multivibrators 16, 34, 36, 37, or 38 and a reply pulse coupled through one of switches 29, 31, 32, or 33 to thus indicate the range and azimuth of the transponding aircraft with respect to the interrogating aircraft.

If the radiation patterns of adjacent antennas overlap, when the transponding aircraft is disposed between the fields of two adjacent receiving antennas two of the lamps 43, providing a corresponding range indication, will be lit at the same time to thus more accurately indicate the azimuth position of the transponding aircraft. Thus, without radiation pattern overlap, ninety degree azimuth accuracy is permissible while with radiation pattern overlap forty-five degree accuracy may be obtained.

The duration of the enabling gate from multivibrators 16, 34, 36, 37, and 38 may be selected to accord with desired range segments, as mentioned above. Thus, for example, the gating pulse from monostable multivibrator 16 may be selected to have a duration of 12.36 microseconds to cover a range segment of 0 to 1 mile. The enabling gate from multivibrator 34 may be selected to have a duration of 24.72 microseconds to accord with a selected range segment of from 1 to 3 miles. The duration of the enabling gates from the remainder of the multivibrators may be accordingly selected.

Delay circuit 14 is provided to compensate for system delays which may be expected to occur in receivers 24, 26, 27, and 28. The delay provided by delay circuit 14 is indicated by the reference letter $t$ in the waveforms of FIG. 2. This delay may also be obtained by elongating the gating pulse from monostable multivibrator 16 by the amount $t$.

When an interrogating pulse is received on one of antennas 19, 21, 22, or 23, the pulse is coupled through receivers 24, 26, 27, or 28 to electronic switches 29, 31, 32, or 33. In the non-interrogating mode, monostable multivibrator 13 is in a quiescent condition and functions to switch the output signal from receivers 24, 26, 27, and 28 to an amplifier 46. The output signal from amplifier 46 is coupled to pulser 12 which functions as above described to cause a radio frequency pulse to be emitted from omnidirectional antenna 18 as a reply pulse. At the same time the output signal from amplifier 46 is coupled to monostable multivibrator 13 to thereupon isolate amplifier 46 from the receivers. Thus, should another aircraft reply to the reply pulse, ring around will be prevented. At the same time since the enabling gate multivibrators are not activated, the display circuits will not be energized upon a reply to a reply pulse to thereby prevent indication when the equipment is not in the interrogating mode.

While not shown, provision may be made for altitude discrimination if desired. For example, an altitude sweep may be accomplished or any selected altitude may be investigated by assigning a pulse code to each altitude level in the interrogating pulse generating circuit. A pulse code decoder may then be provided in amplifier 46 to permit reply pulse altitude discrimination. The pulse encoder and decoder circuits may also, for example, be coupled to be controlled by the aircraft's altimeter to provide automatic altitude discrimination, should this be desired. Further, if desired, an override control function may be provided to investigate other altitudes at will.

The pulse rate from pulser 12 may have a repetition rate of, for example, one pulse per second, and the duration of the gate from multivibrator 13 may have a duration on the order of 300 microseconds (24 nautical miles approximately) to thus provide a low duty cycle. Accordingly, the equipment may then be utilized to transpond to a plurality of interrogations, thus permitting simultaneous operation of a considerable number of units with low probability of interference.

Obviously many modifications and variations of the present invention are possible in the light of the above teachings. It is therefore to be understood that within the scope of the appended claims, the invention may be practiced otherwise than as specifically described.

What is claimed is:

1. An interrogator-transponder system comprising: interrogating pulse generating means; transmitter means coupled to said interrogating pulse generating means; a plurality of sequentially operable gate generating means coupled in cascade to said interrogating pulse generating means; a plurality of fixed directional antennas, a plurality of receiver means respectively coupled to said antennas; a corresponding plurality of display circuit means each comprising a plurality of coincidence circuit means each having an indicator device coupled in the output circuit thereof; a plurality of switch means respectively coupling an input circuit of the coincidence circuit means in each of said display means in common to one of said receiver means; circuit means coupling another input circuit of a coincidence circuit means in each of said display means in common to one of said sequentially operable gate generating means; long gate generating means having the input circuit thereof coupled to said interrogating pulse generating means and having the output circuit thereof coupled in common to each of said switch means; and amplifier means having the input circuit thereof coupled in common to said switch means and the output circuit thereof coupled to said transmitter means and to the input circuit of said long gate generating means.

2. The interrogator-transponder of claim 1 wherein: pulse coding means are provided in said transmitting means and pulse decoding means are provided in said amplifier means.

3. The interrogator-transponder of claim 2 wherein said indicator devices are of the visual type and wherein there is further provided a mounting plate and means mounting said indicator devices upon said mounting plate in a geometrical pattern to thereby provide a graphic representation of range and azimuth.

4. An interrogator-transponder system comprising: interrogating pulse generating means; tranmitter means coupled to said interrogating pulse generating means; a plurality of sequentially operable gate generating means coupled in cascade to said interrogating pulse generating means; fixed directional receiver means; a display circuit means comprising a plurality of coincidence circuit means each having an indicator device coupled in the output circuit thereof; switch means coupling an input circuit of said plurality of coincidence circuit means in common to said directional receiver means; circuit means coupling another input circuit of each of said plurality of coincidence circuit means respectively to one of said sequentially operable gate generating means; long gate generating means having the input circuit thereof coupled to said interrogating pulse generating means and having the output circuit thereof coupled to each of said switch means; and amplifier means having the input circuit thereof coupled to said switch means and the output circuit thereof coupled to said transmitter means and to the input circuit of said long gate generating means.

5. The interrogator-transponder of claim 4 wherein: pulse coding means are provided in said transmitting means and pulse decoding means are provided in said amplifier means.

6. The interrogator-transponder of claim 5 wherein said indicator devices are of the visual type and wherein there is further provided a mounting plate and means mounting said indicator devices upon said mounting plate in a geometrical pattern to thereby provide a graphic representation of range and azimuth.

7. An interrogator-transponder system comprising: transmitter means operable to transmit an interrogating signal; a plurality of sequentially operable gate generating means coupled in cascade to said transmitter means; a plurality of fixed directional antennas, a plurality of receiver means respectively coupled to said antennas and operable to receive a reply signal; a corresponding plurality of display circuit means each comprising a plurality of coincidence circuit means each having an indicator device coupled in the output circuit thereof; a plurality of switch means respectively coupling an input circuit of the coincidence circuit means in each of said display means in common to one of said directional receiver means; circuit means coupling another input circuit of a coincidence circuit means in each of said display means in common to one of said sequentially operable gate generating means; long gate generating means having the input circuit thereof coupled to said transmitter means and having the output circuit thereof coupled in common to each of said switch means; and circuit means including said switch means coupling said receiver means to said transmitter means and to the input circuit of said long gate generating means.

8. The interrogator-transponder of claim 7 wherein: pulse coding means are provided in said transmitting means and pulse decoding means are provided in said last mentioned circuit.

9. The interrogator-transponder of claim 8 wherein said indicator devices are of the visual type and wherein there is further provided a mounting plate and means mounting said indicator devices upon said mounting plate in a geometrical pattern to thereby provide a graphic representation of range and azimuth.

10. An interrogator-transponder system comprising: transmitter means operable to transmit an interrogating signal; a plurality of sequentially operable gate generating means coupled in cascade to said transmitter means; fixed directional receiver means operable to receive a reply signal; a display circuit means comprising a plurality of coincidence circuit means each having an indicator device coupled in the output circuit thereof; a switch means coupling an input circuit of each of said coincidence circuit means in common to said directional receiver means; circuit means coupling another input circuit of each of said coincidence circuit means to one of said sequentially operable gate generating means; long gate generating means having the input circuit thereof coupled to said transmitter means and having the output circuit thereof coupled to said switch means; and circuit means including said switch means coupling said receiver means to said transmitter means and to the input circuit of said long gate generating means.

11. The interrogator-transponder of claim 10 wherein: pulse coding means are provided in said transmitting means and pulse decoding means are provided in said last mentioned circuit.

12. The interrogator-transponder of claim 11 wherein said indicator devices are of the visual type and wherein there is further provided a mounting plate and means mounting said indicator devices upon said mounting plate in a geometrical pattern to thereby provide a graphic representation of range and azimuth.

References Cited in the file of this patent
UNITED STATES PATENTS

| | | |
|---|---|---|
| 2,962,708 | De Rosa | Nov. 29, 1960 |
| 2,995,742 | Branden | Aug. 8, 1961 |
| 3,004,254 | Steinberg | Oct. 10, 1961 |